(12) United States Patent
Jang et al.

(10) Patent No.: US 10,414,876 B2
(45) Date of Patent: Sep. 17, 2019

(54) METHOD FOR PREPARING SUPERABSORBENT RESIN COMPRISING FINE POWDER RE-ASSEMBLED BODY OF SUPERABSORBENT RESIN, AND SUPERABSORBENT RESIN PREPARED THEREBY

(71) Applicant: LG Chem, Ltd., Seoul (KR)

(72) Inventors: Min-Seok Jang, Daejeon (KR); Young Sam Kim, Daejeon (KR)

(73) Assignee: LG Chem, Ltd. (KR)

( * ) Notice: Subject to any disclaimer, the term of this patent is extended or adjusted under 35 U.S.C. 154(b) by 334 days.

(21) Appl. No.: 15/327,212

(22) PCT Filed: Apr. 12, 2016

(86) PCT No.: PCT/KR2016/003849
§ 371 (c)(1),
(2) Date: Jan. 18, 2017

(87) PCT Pub. No.: WO2016/200041
PCT Pub. Date: Dec. 15, 2016

(65) Prior Publication Data
US 2017/0166707 A1    Jun. 15, 2017

(30) Foreign Application Priority Data
Jun. 9, 2015 (KR) .................. 10-2015-0081161

(51) Int. Cl.
| | |
|---|---|
| *B01J 20/26* | (2006.01) |
| *C08F 2/10* | (2006.01) |
| *C08J 3/075* | (2006.01) |
| *C08J 3/24* | (2006.01) |
| *C08K 3/20* | (2006.01) |
| *C08F 2/48* | (2006.01) |
| *C08F 6/00* | (2006.01) |

(52) U.S. Cl.
CPC ............. *C08J 3/075* (2013.01); *B01J 20/267* (2013.01); *C08F 2/10* (2013.01); *C08F 2/48* (2013.01); *C08F 6/008* (2013.01); *C08J 3/24* (2013.01); *C08J 3/245* (2013.01); *C08K 3/20* (2013.01); *C08J 2333/02* (2013.01)

(58) Field of Classification Search
CPC .......... B01J 20/267; C08F 6/008; C08J 3/075; C08J 3/24; C08J 2333/02; C08K 3/20
See application file for complete search history.

(56) References Cited

U.S. PATENT DOCUMENTS

| | | | |
|---|---|---|---|
| 2004/0204554 A1 | 10/2004 | Ko et al. | |
| 2010/0099781 A1 | 4/2010 | Tian et al. | |
| 2015/0259522 A1 | 9/2015 | Lee et al. | |
| 2016/0045895 A1 | 2/2016 | Won et al. | |

FOREIGN PATENT DOCUMENTS

| | | |
|---|---|---|
| KR | 20110087293 A | 8/2011 |
| KR | 20140063457 A | 5/2014 |
| KR | 101507287 B1 | 3/2015 |
| KR | 20150032045 A | 3/2015 |
| KR | 20150061270 A | 6/2015 |
| WO | 2006101271 A1 | 9/2006 |

OTHER PUBLICATIONS

International Search Report from PCT/KR2016/003849, dated Jul. 29, 2016.

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP

(57) ABSTRACT

Disclosed are a method of preparing a superabsorbent polymer that includes a fine-powder regranulate and has improved properties owing to the use of an additive, and a superabsorbent polymer prepared thereby, wherein the superabsorbent polymer can exhibit improved properties, including high centrifugal retention capacity (CRC) and fine-powder agglomeration strength, without decreasing absorption under pressure (AUP) or permeability, compared to when no additive is used during the formation of a fine-powder regranulate, and furthermore, the fine powder is recycled, thus reducing processing costs, thereby generating economic benefits.

16 Claims, No Drawings

METHOD FOR PREPARING SUPERABSORBENT RESIN COMPRISING FINE POWDER RE-ASSEMBLED BODY OF SUPERABSORBENT RESIN, AND SUPERABSORBENT RESIN PREPARED THEREBY

CROSS-REFERENCE TO RELATED APPLICATIONS

The present application is a national phase entry under 35 U.S.C. § 371 of International Application No. PCT/KR2016/003849 filed on Apr. 12, 2016, which claims priority to and the benefit of Korean Patent Application No. KR 10-2015-0081161, filed on Jun. 9, 2015, the disclosures of which are hereby incorporated by reference in their entirety.

TECHNICAL FIELD

The present invention relates to a method of preparing a superabsorbent polymer including a fine-powder regranulate of the superabsorbent polymer, and to a superabsorbent polymer prepared thereby.

BACKGROUND ART

Superabsorbent polymers (SAPs, or superabsorbent resins) are synthetic polymer materials that are able to absorb about 500 to 1000 times their own weight in moisture. Such superabsorbent polymers have begun to be used in real-world applications for sanitary items, and are currently being widely utilized not only in hygiene products, such as disposable baby diapers and the like, but also in soil conditioners for gardening applications, water stopping agents for civil engineering and construction applications, sheets for raising seedlings, freshness preservatives for food distribution, fomentation materials, etc.

Such a superabsorbent polymer may be prepared through reverse-phase suspension polymerization or aqueous polymerization. A hydrogel polymer obtained through a polymerization reaction is typically dried and then ground, and the powdered product thereof is commercially available. As such, in the process of pulverizing the dried polymer, fine powder having a particle size of about 150 μm or less, falling out of the normal particle size range, is generated. This fine powder cannot be sold as a normal product. When superabsorbent polymer particles containing such fine powder are applied to products, they may move before use or may exhibit deteriorated properties.

Hence, this fine powder is excluded from the final polymer product or is subjected to a regranulation process for agglomerating fines so as to fall within the normal particle size range. As such, the regranulated fine-powder has to possess high agglomeration strength so as not to deagglomerate again. Typically, in order to increase agglomeration strength, a regranulation process is performed in a wet state. In this regard, Korean Patent Application Publication No. 2014-0063457 discloses a method of preparing a superabsorbent polymer, which includes forming a fine-powder regranulate using only fine powder and water, without the use of additives, but is problematic because the properties of this superabsorbent polymer may deteriorate compared to a superabsorbent polymer without the use of fine powder.

DISCLOSURE

Technical Problem

Accordingly, the present invention has been made keeping in mind the above problems encountered in the related art, and an object of the present invention is to provide a method of preparing a superabsorbent polymer and a superabsorbent polymer prepared thereby, wherein a fine-powder regranulate having improved properties owing to the use of an additive may be added to the preparation process and may thus be efficiently recycled, and the properties of the superabsorbent polymer are not deteriorated even when the fine powder is recycled.

Technical Solution

In order to accomplish the above object, the present invention provides a method of preparing a superabsorbent polymer, comprising the steps of: 1) subjecting a monomer composition, comprising a water-soluble ethylenic unsaturated monomer and a polymerization initiator, to thermal polymerization or photopolymerization, thus obtaining a hydrogel polymer, 2) drying and pulverizing a portion of the hydrogel polymer of step 1), and then classifying into a base polymer having a particle size of 150 to 850 μm and a first fine powder having a particle size of less than 150 μm, 3) mixing a portion of the first fine powder, a portion of the hydrogel polymer of step 1), and an additive, thus preparing a fine-powder regranulate, 4) mixing the fine-powder regranulate with a portion of the hydrogel polymer of step 1) and then performing drying and pulverizing, followed by classifying into a superabsorbent polymer having a particle size of 150 to 850 μm and a second fine powder having a particle size of less than 150 μm, thus obtaining the superabsorbent polymer, and 5) mixing the second fine powder with a portion of the first fine powder, a portion of the hydrogel polymer of step 1), and an additive, thus forming a fine-powder regranulate, wherein the fine-powder regranulate is recirculated back to step 4).

In addition, the present invention provides a superabsorbent polymer prepared by the above method.

Advantageous Effects

In a superabsorbent polymer and a method of preparing the same according to the present invention, an additive is used in the course of regranulating fine powder, and the resulting superabsorbent polymer has improved properties, such as high centrifugal retention capacity (CRC) and high agglomeration strength, without decreasing absorption under pressure (AUP) or permeability, compared to when no additive is used. Because the fine powder is recycled, processing costs can be reduced, thereby generating economic benefits.

BEST MODE

The present invention addresses a method of preparing a superabsorbent polymer. In the method of preparing the superabsorbent polymer according to the present invention, fine powder may be recycled, thus reducing processing costs, thereby generating economic benefits. Furthermore, an additive is used during the formation of a fine-powder regranulate, yielding a superabsorbent polymer having improved properties, such as high CRC, AUP, absorption speed and the like, as well as high fine-powder agglomeration strength.

Hereinafter, a detailed description will be given of the present invention.

According to the present invention, the method of preparing a superabsorbent polymer includes the steps of: 1) subjecting a monomer composition, comprising a water-soluble ethylenic unsaturated monomer and a polymerization initiator, to thermal polymerization or photopolymerization, thus obtaining a hydrogel polymer, 2) drying and pulverizing a portion of the hydrogel polymer of step 1), and then classifying into a base polymer having a particle size of 150 to 850 μm and a first fine powder having a particle size of less than 150 μm, 3) mixing a portion of the first fine powder, a portion of the hydrogel polymer of step 1), and an additive, thus preparing a fine-powder regranulate, 4) mixing the fine-powder regranulate with a portion of the hydrogel polymer of step 1) and then performing drying and pulverizing, followed by classifying into a superabsorbent polymer having a particle size of 150 to 850 μm and a second fine powder having a particle size of less than 150 μm, thus obtaining the superabsorbent polymer, and 5) mixing the second fine powder with a portion of the first fine powder, a portion of the hydrogel polymer of step 1), and an additive, thus forming a fine-powder regranulate, wherein the fine-powder regranulate is recirculated back to step 4).

To obtain the superabsorbent polymer according to the present invention, a polymer may be prepared through steps and methods typically used in the art. Specifically, in the preparation of the superabsorbent polymer according to the present invention, the monomer composition contains the polymerization initiator. Depending on the polymerization method, a photopolymerization initiator may be used upon photopolymerization, and a thermal polymerization initiator may be employed upon thermal polymerization. Even when photopolymerization is conducted, a predetermined amount of heat is generated due to irradiation with UV light, and also due to polymerization, which is an exothermic reaction, and thus a thermal polymerization initiator may be additionally included.

In the method of preparing the superabsorbent polymer according to the present invention, the thermal polymerization initiator is not particularly limited, but preferably includes at least one selected from the group consisting of a persulfate-based initiator, an azo-based initiator, hydrogen peroxide, and ascorbic acid. In particular, examples of the persulfate-based initiator may include sodium persulfate ($Na_2S_2O_8$), potassium persulfate ($K_2S_2O_8$), and ammonium persulfate (($NH_4)_2S_2O_8$); and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis [2-(2-imidazolin-2-yl)propane]dihydrochloride, and 4,4-azobis-(4-cyanovaleric acid).

In the method of preparing the superabsorbent polymer according to the present invention, the photopolymerization initiator is not particularly limited, but preferably includes at least one selected from the group consisting of benzoin ether, dialkyl acetophenone, hydroxyl alkylketone, phenyl glyoxylate, benzyl dimethyl ketal, acyl phosphine, and α-aminoketone. A specific example of the acyl phosphine may include commercially available Lucirin TPO, that is, 2,4,6-trimethyl-benzoyl-trimethyl phosphine oxide.

In the method of preparing the superabsorbent polymer according to the present invention, the water-soluble ethylenic unsaturated monomer is not particularly limited, so long as it is a monomer typically used to synthesize a superabsorbent polymer, and preferably includes any one or more selected from the group consisting of an anionic monomer and salts thereof, a nonionic hydrophilic monomer, and an amino group-containing unsaturated monomer and quaternary salts thereof. Specifically useful is at least one selected from the group consisting of anionic monomers and salts thereof, such as acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; nonionic hydrophilic monomers such as (meth)acrylamide, N-substituted (meth)acrylate, 2-hydroxyethyl(meth)acrylate, 2-hydroxypropyl(meth)acrylate, methoxypolyethyleneglycol (meth)acrylate, and polyethyleneglycol (meth)acrylate; and amino group-containing unsaturated monomers and quaternary salts thereof such as (N,N)-dimethylaminoethyl (meth)acrylate and (N,N)-dimethylaminopropyl (meth)acrylamide. More preferably, acrylic acid or salts thereof are used. When acrylic acid or salts thereof are used as the monomer, a superabsorbent polymer having increased absorbability may be advantageously obtained.

In the method of preparing the superabsorbent polymer according to the present invention, the concentration of the water-soluble ethylenic unsaturated monomer of the monomer composition may be appropriately determined in consideration of the polymerization time and the reaction conditions, and is preferably set to 40 to 55 wt %. If the concentration of the water-soluble ethylenic unsaturated monomer is less than 40 wt %, economic benefits are negated. On the other hand, if the concentration thereof exceeds 55 wt %, the pulverizing efficiency of the hydrogel polymer may decrease.

Whether the hydrogel polymer is prepared from the monomer composition using thermal polymerization or photopolymerization is not limited, so long as it is typically useful. Specifically, polymerization methods are largely classified into thermal polymerization and photopolymerization, depending on the source of energy used for polymerization. Typically, thermal polymerization is conducted using a reactor having a stirring shaft, such as a kneader, and photopolymerization is implemented using a reactor having a movable conveyor belt. However, the above polymerization methods are merely illustrative, and the present invention is not limited to those polymerization methods. For example, hot air is fed to a reactor with a stirring shaft, such as a kneader, or the reactor is heated, so that thermal polymerization is carried out, yielding a hydrogel polymer, which may then be discharged at a size ranging from ones of mm to ones of cm through the outlet of the reactor, depending on the shape of the stirring shaft of the reactor. Specifically, the size of the hydrogel polymer may vary depending on the concentration of the supplied monomer composition and the supply rate thereof, and typically a hydrogel polymer having a particle size of 2 to 50 mm may be obtained.

Also, when photopolymerization is carried out using a reactor having a movable conveyor belt, a hydrogel polymer in sheet form having the same width as the belt may result. As such, the thickness of the polymer sheet may vary depending on the concentration of the supplied monomer composition and the supply rate thereof, but the monomer composition is preferably supplied so as to form a polymer sheet having a thickness of 0.5 to 5 cm. In the case where the monomer composition is supplied to an extent that a very thin polymer sheet is formed, production efficiency may undesirably decrease. If the thickness of the polymer sheet is greater than 5 cm, polymerization may not be uniformly carried out throughout the sheet, which is too thick.

The hydrogel polymer thus obtained typically has a moisture content of 30 to 60 wt %. As used herein, the term "moisture content" refers to an amount of moisture based on the total weight of the hydrogel polymer, that is, a value obtained by subtracting the weight of the dried polymer from the weight of the hydrogel polymer. (Specifically, it is defined as a value calculated by measuring the weight lost from the polymer due to the evaporation of moisture while drying the polymer at a high temperature via IR heating. As such, the drying is performed in such a manner that the temperature is increased from room temperature to 180° C. and then maintained at 180° C., and the total drying time is set to 20 min, including 5 min necessary for increasing the temperature.)

The hydrogel polymer obtained through thermal polymerization or photopolymerization is dried, and the drying temperature is preferably set to 150 to 250° C. As used herein, the term "drying temperature" refers to the temperature of a heat medium supplied for the drying process or the temperature of a drying reactor containing a heat medium and a polymer in the drying process. If the drying temperature is lower than 150° C., the drying time may become excessively long, and the properties of the final superabsorbent polymer may thus be deteriorated. On the other hand, if the drying temperature is higher than 250° C., only the surface of the polymer may be excessively dried, and thereby fine powder may be generated in the subsequent pulverizing process, and the properties of the final superabsorbent polymer may be deteriorated. The drying is preferably performed at a temperature of 150 to 250° C., and more preferably 160 to 200° C.

The drying time is not limited, but may be set to 20 to 90 min, taking processing efficiency into account. Also, the drying process is not limited, so long as it is typically used to dry the hydrogel polymer. Specifically, the drying process may be performed using hot air supply, IR irradiation, microwave irradiation, or UV irradiation. After the drying process the polymer may have a moisture content of 0.1 to 10 wt %. Meanwhile, the method of preparing the superabsorbent polymer according to the present invention may further include a simple pulverizing process before the drying process, as necessary, in order to increase the drying efficiency. The simple pulverizing process is conducted before the drying process so that the particle size of the hydrogel polymer falls in the range of 1 to 15 mm. Pulverizing the particle size of the polymer to less than 1 mm is technically difficult due to the high moisture content of the hydrogel polymer, and the ground particles may agglomerate. On the other hand, if the polymer is ground to a particle size larger than 15 mm, the effect of increasing the drying efficiency via the pulverizing process may become insignificant.

In the simple pulverizing process that precedes the drying process, any pulverizer (or grinder) may be used without limitation. A specific example thereof may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

When the pulverizing process is performed to increase the drying efficiency before the drying process in this way, the polymer, which has high moisture content, may stick to the surface of the pulverizer (or grinder). Thus, in order to increase the pulverizing efficiency of the hydrogel polymer before the drying process, an additive able to prevent stickiness may be further used upon pulverizing. The specific kind of additive that may be found useful is not limited, and examples thereof may include, but are not limited to, a fine-powder agglomeration inhibitor, such as steam, water, a surfactant, and inorganic powder such as clay or silica; a thermal polymerization initiator, such as a persulfate-based initiator, an azo-based initiator, hydrogen peroxide, and ascorbic acid; and a crosslinking agent, such as an epoxy-based crosslinking agent, a diol-based crosslinking agent, a bifunctional or trifunctional or higher polyfunctional acrylate, and a monofunctional compound having a hydroxyl group.

After the drying process in the method of preparing the superabsorbent polymer according to the present invention, the dried polymer is ground. The polymer resulting from such a pulverizing process has a particle size of 150 to 850 μm. In the method of preparing the superabsorbent polymer according to the present invention, a pulverizer (or grinder) used to obtain such a particle size may include, but is not limited to, a pin mill, a hammer mill, a screw mill, a roll mill, a disc mill, or a jog mill.

In an embodiment of the present invention, the additive used in step 3) may include at least one, and preferably includes at least two, selected from the group consisting of sodium hydroxide (NaOH), sodium persulfate (SPS), and particles having i) a BET specific surface area of 300 to 1500 $m^2/g$ and ii) a porosity of 50% or more. Since any additive is used together with water, it is finally provided in the form of an aqueous solution. When sodium hydroxide is used as the additive, CRC may be increased. When sodium persulfate (SPS) is used, gel strength may be increased. When particles are used, permeability may be increased. When all of the above three additive components are used, the effects of the invention may be maximized.

In the case where the additive comprising sodium hydroxide, sodium persulfate and particles is used, based on the total weight (containing water that is added together) of the additive, the amount of sodium hydroxide is 1 to 5 wt %, the amount of sodium persulfate (SPS) is 0.05 to 0.5 wt %, and the amount of particles is 0.01 to 0.4 wt %. Also, when the additive comprising sodium hydroxide and sodium persulfate is used, sodium hydroxide and sodium persulfate may be added in amounts of 1 to 5 wt % and 0.05 to 0.5 wt %, respectively, based on the total weight of the additive. Also, when the additive comprising sodium hydroxide and particles is used, sodium hydroxide and particles may be added in amounts of 1 to 5 wt % and 0.01 to 0.4 wt %, respectively, based on the total weight of the additive. Also, when the additive comprising sodium persulfate and particles is used, sodium persulfate and particles may be added in amounts of 0.05 to 0.5 wt % and 0.01 to 0.4 wt %, respectively, based on the total weight of the additive.

The particles may have a BET specific surface area of 300 to 1500 $m^2/g$, preferably 500 to 1500 $m^2/g$, and more preferably 700 to 1500 $m^2/g$. The particles may have superhydrophobicity with a water contact angle of 125° or more, preferably 140° or more, and more preferably 145° or more. The particles may have a porosity of 50% or more, and preferably 90% or more, and may have a particle size ranging from 2 nm to 50 μm. The particles used in the present invention are not limited so long as they have the above properties i) and ii). Specific examples of the particles may include, but are not limited to, inorganic oxides, such as silica ($SiO_2$), alumina, titania ($TiO_2$), and carbon, inorganic compounds, organic polymers, ion exchange resins, metals, metal salts, etc. Preferably useful is silica ($SiO_2$).

In another embodiment of the present invention, the first fine powder is preferably used in an amount greater than the weight of the second fine powder, but the present invention is not limited thereto.

In the method of preparing the superabsorbent polymer according to the present invention, the hydrogel polymer is mixed in an amount of 100 to 2000 parts by weight, preferably 300 to 2000 parts by weight, and more preferably 900 to 2000 parts by weight, based on 100 parts by weight of the fine-powder regranulate of step 3), but the present invention is not limited thereto.

The method of preparing the superabsorbent polymer according to the present invention may further include surface crosslinking the superabsorbent polymer using a surface crosslinking agent, after step 4) for recirculating, to steps 2) and 3), the first fine powder and the second fine powder in a mixture with the hydrogel polymer of step 2). The surface crosslinking agent may include any one or more selected from the group consisting of water; a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a multivalent metal salt; particles having i) a BET specific surface area of 300 to 1500 $m^2/g$ and ii) a porosity of 50% or more; an organic carboxylic acid compound; and an alkylene carbonate compound. Preferably useful is at least one selected from the group consisting of water, methanol, particles having i) a BET specific surface area of 300 to 1500 $m^2/g$ and ii) a porosity of 50% or more, and oxalic acid.

Specifically, the particles preferably include at least one selected from the group consisting of silica, alumina, carbon, and titania. Most preferably useful is silica. Specifically, the polyhydric alcohol compound may include at least one selected from the group consisting of mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol. Also, examples of the epoxy compound may include ethylene glycol diglycidyl ether and glycidol, and the polyamine compound may include at least one selected from the group consisting of ethylene diamine, diethylene triamine, triethylene tetramine, tetraethylene pentamine, pentaethylene hexamine, polyethyleneimine, and polyamide polyamine.

Examples of the haloepoxy compound may include epichlorohydrin, epibromohydrin, and α-methyl epichlorohydrin. The mono-, di- or poly-oxazolidinone compound may be exemplified by 2-oxazolidinone. The alkylene carbonate compound may include ethylene carbonate. These compounds may be used alone or in combination. In order to increase the efficiency of the surface crosslinking process, the surface crosslinking agent preferably includes, but is not limited to, at least one polyhydric alcohol compound, and more preferably a polyhydric alcohol compound having 2 to 10 carbon atoms.

In an embodiment of the present invention, the amount of the surface crosslinking agent added to treat the surface of the polymer particles may be appropriately determined depending on the kind of surface crosslinking agent or the reaction conditions, and is set to 0.001 to 5 parts by weight, preferably 0.01 to 3 parts by weight, and more preferably 0.05 to 2 parts by weight, based on 100 parts by weight of the polymer. If the amount of the surface crosslinking agent is too small, the surface crosslinking reaction does not readily occur. On the other hand, if the amount thereof exceeds 5 parts by weight based on 100 parts by weight of the polymer, the properties of the superabsorbent polymer may deteriorate due to excessive surface crosslinking reactions. Here, the method whereby the surface crosslinking agent is added to the polymer is not limited. Specifically, the surface crosslinking agent and the polymer powder may be placed in a reaction bath and mixed, the surface crosslinking agent may be sprayed onto the polymer powder, or the polymer and the crosslinking agent may be continuously supplied and mixed using a reaction bath, such as a mixer that operates continuously.

The temperature of the polymer itself may be 20 to 90° C. when the surface crosslinking agent is added, so that the temperature is increased to the reaction temperature within 1 to 60 min to perform surface crosslinking in the presence of the surface crosslinking agent. To realize the above temperature of the polymer itself, processes after the drying process, which is carried out at a relatively high temperature, are continuously performed, and the processing time may be shortened. Alternatively, the polymer may be heated separately when it is difficult to shorten the processing time. In the method of preparing the superabsorbent polymer according to the present invention, the surface crosslinking agent added to the polymer may be heated, so that the temperature is increased to the reaction temperature within 1 to 60 min to perform surface crosslinking in the presence of the surface crosslinking agent.

In another embodiment of the present invention, when the surface crosslinking agent is added, the surface temperature of the polymer preferably falls in the range of 60 to 90° C., and the temperature of the surface crosslinking agent preferably falls in the range of 5 to 40° C., but the present invention is not limited thereto. More specifically, in the method of preparing the superabsorbent polymer according to the present invention, when the surface crosslinking reaction is carried out after the temperature is increased to the reaction temperature within 1 to 60 min so as to prepare for surface crosslinking, the efficiency of the surface crosslinking process may be increased. Ultimately, the residual monomer content of the final superabsorbent polymer may be minimized, and a superabsorbent polymer having superior properties may be attained. As such, the temperature of the added surface crosslinking agent is adjusted within the range from 5 to 60° C., and preferably 10 to 40° C. If the temperature of the surface crosslinking agent is lower than 5° C., the heating rate reduction effect may become insignificant in terms of realizing the surface crosslinking reaction via heating using the surface crosslinking agent. On the other hand, if the temperature of the surface crosslinking agent is higher than 60° C., the surface crosslinking agent may not be uniformly dispersed in the polymer. As used herein, the surface crosslinking reaction temperature may be defined as the combined temperature of the polymer and the surface crosslinking agent that is added for the crosslinking reaction. The heating member for the surface crosslinking reaction is not limited. Specifically, a heat medium may be supplied, or direct heating may be conducted using electricity, but the present invention is not limited thereto. Specific examples of the heat source may include steam, electricity, UV light, and IR light, an also, a heated thermal fluid may be used.

In the method of preparing the superabsorbent polymer according to the present invention, after heating for the crosslinking reaction, the crosslinking reaction is carried out for 1 to 120 min, preferably 5 to 40 min, and more preferably 10 to 20 min. If the crosslinking reaction time is shorter than 1 min, the crosslinking reaction may not sufficiently occur. On the other hand, if the crosslinking reaction time is longer than 60 min, the properties of the superabsorbent polymer may deteriorate due to the excessive surface crosslinking reaction, and attrition of the polymer may occur due to long-term residence in the reactor.

Also, the superabsorbent polymer produced by reacting the hydrogel polymer with the surface crosslinking agent may be further ground. The particle size of the superabsorbent polymer thus ground ranges from 150 to 850 μm. Specific examples of a pulverizer (or grinder) used to obtain such a particle size may include, but are not limited to, a pin mill, a hammer mill, a screw mill, a roll mill, a disc mill, and a jog mill.

In addition, the present invention addresses a superabsorbent polymer prepared by the aforementioned method. The superabsorbent polymer may exhibit a CRC of 40 to 60 g/g when measured using the EDANA method WSP 241.2, and a permeability of 1,200 sec or more, but the present invention is not limited thereto.

MODE FOR INVENTION

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims.

EXAMPLES

Preparation Examples

Preparation Example 1

Preparation of Base Polymer and First Fine Powder 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture having a monomer concentration of 50 wt %. The monomer mixture was then placed on a continuously moving conveyor belt and irradiated with UV light (at 2 mW/cm$^2$) so that UV polymerization was carried out for 2 min, thus obtaining a hydrogel polymer. The hydrogel polymer was cut to a size of 5×5 mm, dried in a hot air oven at 170° C. for 2 hr, pulverized using a pin mill, and then classified using a standard sieve based on ASTM standards, thereby obtaining a base polymer having a particle size of 150 to 850 μm and fine-powder particles having a particle size of less than 150 μm.

Preparation Example 2

Preparation of Second Fine Powder

The base polymer obtained in Preparation Example 1 was swollen in water. While the swollen base polymer and the fine-powder particles were mixed using a high-speed rotary stirrer, an aqueous solution comprising 3 wt % of sodium hydroxide, 0.15 wt % (1500 ppm) of sodium persulfate (SPS), and 0.1 wt % (1000 ppm) of silica aerogel (Aero-Zel™, made by JIOS) was sprayed thereon, resulting in a fine-powder regranulate. The fine-powder regranulate was stirred together with the hydrogel polymer of Preparation Example 1, thus affording a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a base polymer having a particle size of 150 to 850 μm and fine-powder particles having a particle size of less than 150 μm.

Preparation Example 3

Preparation of Fine-Powder Particles Containing No Additive

The base polymer obtained in Preparation Example 1 was swollen in water. While the swollen base polymer and the fine-powder particles were mixed using a high-speed rotary stirrer, water was sprayed thereon, resulting in a fine-powder regranulate. The fine-powder regranulate was stirred together with the hydrogel polymer of Preparation Example 1, thus affording a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a base polymer having a particle size of 150 to 850 μm and fine-powder particles having a particle size of less than 150 μm.

Preparation Example 4

Preparation of Fine-Powder Particles Containing Sodium Hydroxide Additive

The base polymer obtained in Preparation Example 1 was swollen in water. While the swollen base polymer and the fine-powder particles were mixed using a high-speed rotary stirrer, an aqueous solution comprising 3 wt % of sodium hydroxide was sprayed thereon, resulting in a fine-powder regranulate. The fine-powder regranulate was stirred together with the hydrogel polymer of Preparation Example 1, thus affording a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a base polymer having a particle size of 150 to 850 μm and fine-powder particles having a particle size of less than 150 μm.

REFERENCE EXAMPLES

Reference Example 1

Superabsorbent Polymer Prepared Without Use of Fine-Powder Regranulate 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture having a monomer concentration of 50 wt %. The monomer mixture was then placed on a continuously moving conveyor belt and irradiated with UV light (at 2 mW/cm$^2$) so that UV polymerization was carried out for 2 min, thus obtaining a hydrogel polymer. The hydrogel polymer thus obtained was cut to a size of 5×5 mm, dried in a hot air oven at 170° C. for 2 hr, pulverized using a pin mill, and then classified using a sieve, thereby obtaining a superabsorbent polymer having a particle size of 150 to 850 μm. Thereafter, the superabsorbent polymer was surface crosslinked using 3.5% ethyleneglycol diglycidyl ether, allowed to react at 120° C. for 1 hr, pulverized, and classified using a sieve, thus yielding a surface-treated superabsorbent polymer having a particle size of 150 to 850 μm.

Reference Examples 2 to 5

Superabsorbent Polymer Prepared Without Use of Second Fine Powder (Using Additive)

Reference Example 2

(1) Preparation of Fine-Powder Regranulate 800 g of the base polymer obtained in Preparation Example 1 was swollen in 1500 g of water. While 2300 g of the swollen base polymer and 200 g of the fine-powder particles having a particle size of less than 150 μm of Preparation Example 1 were mixed using a high-speed rotary stirrer, an aqueous solution comprising sodium hydroxide, sodium persulfate (SPS), and silica aerogel (AeroZel™, made by JIOS) was sprayed thereon, thus yielding a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and then stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of aerogel, and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Reference Example 3

A superabsorbent polymer was obtained in the same manner as in Reference Example 2, with the exception that the fine-powder regranulate and the hydrogel made in Preparation Example 1 were added at a weight ratio of 10:90 in (2) of Reference Example 2.

Reference Example 4

A superabsorbent polymer was obtained in the same manner as in Reference Example 2, with the exception that the fine-powder regranulate and the hydrogel made in Preparation Example 1 were added at a weight ratio of 25:75 in (2) of Reference Example 2.

Reference Example 5

A superabsorbent polymer was obtained in the same manner as in Reference Example 2, with the exception that the fine-powder regranulate and the hydrogel made in Preparation Example 1 were added at a weight ratio of 50:50 in (2) of Reference Example 2.

Reference Comparative Example 1

Superabsorbent Polymer Prepared Without Use of Second Fine Powder (Using No Additive)

(1) Preparation of Fine-Powder Regranulate 800 g of the base polymer obtained in Preparation Example 1 was swollen in 1500 g of water. While 2300 g of the swollen base polymer and 200 g of the fine-powder particles having a particle size of less than 150 μm of Preparation Example 1 were mixed using a high-speed rotary stirrer, water was sprayed thereon, thus yielding a fine-powder regranulate.

(2) Preparation of Base Polymer Including Regranulate

The fine-powder regranulate made in (1) above was swollen in water to give a hydrogel polymer. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of aerogel, and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

EXAMPLES

The Present Invention

Example 1

(1) Preparation of Fine-Powder Regranulate

The fine-powder particles having a particle size of less than 150 μm of Preparation Example 1 and the fine-powder particles having a particle size of less than 150 μm of Preparation Example 2 were mixed at a weight ratio of 8:2, and then further mixed with the swollen base polymer using a high-speed rotary stirrer, thus preparing a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Example 2

A superabsorbent polymer was obtained in the same manner as in Example 1, with the exception that the fine-powder regranulate and the hydrogel made in Preparation Example 1 were added at a weight ratio of 10:90 in (2) of Example 1.

Example 3

A superabsorbent polymer was obtained in the same manner as in Example 1, with the exception that the fine-powder regranulate and the hydrogel made in Preparation Example 1 were added at a weight ratio of 25:75 in (2) of Example 1.

Example 4

A superabsorbent polymer was obtained in the same manner as in Example 1, with the exception that the fine-powder regranulate and the hydrogel made in Preparation Example 1 were added at a weight ratio of 50:50 in (2) of Example 1.

Example 5

(1) Preparation of Fine-Powder Regranulate 800 g of the base polymer of Preparation Example 1 was swollen in 1500 g of water. The fine-powder particles having a particle size of less than 150 μm of Preparation Example 1 and the fine-powder particles having a particle size of less than 150 μm of Preparation Example 2 were mixed at a weight ratio of 7:3, and then further mixed with the swollen base polymer using a high-speed rotary stirrer, thus preparing a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Example 6

A superabsorbent polymer was obtained in the same manner as in Example 5, with the exception that the fine-powder regranulate and the hydrogel made in Preparation Example 1 were added at a weight ratio of 10:90 in (2) of Example 5.

Example 7

A superabsorbent polymer was obtained in the same manner as in Example 5, with the exception that the fine-powder regranulate and the hydrogel made in Preparation Example 1 were added at a weight ratio of 25:75 in (2) of Example 5.

Example 8

A superabsorbent polymer was obtained in the same manner as in Example 5, with the exception that the fine-powder regranulate and the hydrogel made in Preparation Example 1 were added at a weight ratio of 50:50 in (2) of Example 5.

Example 9

(1) Preparation of Fine-Powder Regranulate 800 g of the base polymer of Preparation Example 1 was swollen in 1500 g of water. The fine-powder particles having a particle size of less than 150 μm of Preparation Example 1 and the fine-powder particles having a particle size of less than 150 μm of Preparation Example 2 were mixed at a weight ratio of 6:4, and then further mixed with the swollen base polymer using a high-speed rotary stirrer, thus preparing a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Example 10

A superabsorbent polymer was obtained in the same manner as in Example 9, with the exception that the fine-powder regranulate and the hydrogel made in Preparation Example 1 were added at a weight ratio of 10:90 in (2) of Example 9.

Example 11

A superabsorbent polymer was obtained in the same manner as in Example 9, with the exception that the fine-powder regranulate and the hydrogel made in Preparation Example 1 were added at a weight ratio of 25:75 in (2) of Example 9.

Example 12

A superabsorbent polymer was obtained in the same manner as in Example 9, with the exception that the fine-powder regranulate and the hydrogel made in Preparation Example 1 were added at a weight ratio of 50:50 in (2) of Example 9.

COMPARATIVE EXAMPLES

Comparative Examples 1 to 4

Superabsorbent Resin Prepared by Recycling Fine Powder Without Use of Additive

Comparative Example 1

(1) Preparation of Fine-Powder Regranulate 800 g of the base polymer of Preparation Example 1 was swollen in 1500 g of water. The fine-powder particles having a particle size of less than 150 μm of Preparation Example 1 and the fine-powder particles having a particle size of less than 150 μm of Preparation Example 3 were mixed at a weight ratio of 8:2, and then further mixed with the swollen base polymer using a high-speed rotary stirrer, thus preparing a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Comparative Example 2

A superabsorbent polymer was obtained in the same manner as in Comparative Example 1, with the exception that the fine-powder regranulate and the hydrogel made in Preparation Example 1 were added at a weight ratio of 10:90 in (2) of Comparative Example 1.

Comparative Example 3

A superabsorbent polymer was obtained in the same manner as in Comparative Example 1, with the exception that the fine-powder regranulate and the hydrogel made in Preparation Example 1 were added at a weight ratio of 25:75 in (2) of Comparative Example 1.

Comparative Example 4

A superabsorbent polymer was obtained in the same manner as in Comparative Example 1, with the exception that the fine-powder regranulate and the hydrogel made in Preparation Example 1 were added at a weight ratio of 50:50 in (2) of Comparative Example 1.

Comparative Examples 5 to 8

Superabsorbent Resin Prepared Using Only Fine-Powder Regranulate without Mixing with Base Polymer

Comparative Example 5

(1) Preparation of Fine-Powder Regranulate 800 g of the base polymer of Preparation Example 1 was swollen in 1500 g of water. The fine-powder particles having a particle size of less than 150 μm of Preparation Example 1 and the fine-powder particles having a particle size of less than 150 μm of Preparation Example 2 were mixed at a weight ratio of 8:2, and then further mixed with the swollen base polymer using a high-speed rotary stirrer, thus preparing a fine-powder regranulate.

(2) Preparation of Base Polymer Including Regranulate 100 g of the fine-powder regranulate obtained in (1) above was swollen in water to give a hydrogel polymer. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 μm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 μm.

Comparative Example 6

A superabsorbent polymer was obtained in the same manner as in Reference Comparative Example 1, with the exception that the fine-powder particles having a particle size of less than 150 μm of Preparation Example 1 and the fine-powder particles having a particle size of less than 150 μm of Preparation Example 2 were mixed at a weight ratio of 7:3 in (1) of Comparative Example 5.

Comparative Example 7

A superabsorbent polymer was obtained in the same manner as in Reference Comparative Example 1, with the exception that the fine-powder particles having a particle size of less than 150 μm of Preparation Example 1 and the fine-powder particles having a particle size of less than 150 μm of Preparation Example 2 were mixed at a weight ratio of 6:4 in (1) of Comparative Example 5.

Comparative Example 8

(1) Preparation of Fine-Powder Regranulate 800 g of the base polymer of Preparation Example 1 was swollen in 1500 g of water. The fine-powder particles having a particle size of less than 150 μm of Preparation Example 1 and the fine-powder particles having a particle size of less than 150 µm of Preparation Example 3 were mixed at a weight ratio of 8:2, and then further mixed with the swollen base polymer using a high-speed rotary stirrer, thus preparing a fine-powder regranulate.

(2) Preparation of Base Polymer Including Regranulate

The fine-powder regranulate obtained in (1) above was swollen in water to give a hydrogel polymer. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 µm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 µm.

Comparative Example 9

Superabsorbent Resin Prepared by Recycling Fine Powder with Use of Sodium Hydroxide Additive (1) Preparation of Fine-Powder Regranulate 800 g of the base polymer of Preparation Example 1 was swollen in 1500 g of water. The fine-powder particles having a particle size of less than 150 µm of Preparation Example 1 and the fine-powder particles having a particle size of less than 150 µm of Preparation Example 4 were mixed at a weight ratio of 8:2, and then further mixed with the swollen base polymer using a high-speed rotary stirrer, thus preparing a fine-powder regranulate.

(2) Preparation of Base Polymer Including Regranulate

The fine-powder regranulate obtained in (1) above and the hydrogel made in Preparation Example 1 were placed at a weight ratio of 5:95 in a high-speed rotary stirrer and stirred, thus obtaining a hydrogel polymer including a fine-powder regranulate. The hydrogel polymer was cut to a size of 5×5 mm, dried in a hot air oven at 170° C. for 2 hr, pulverized using a pin mill and then classified using a standard sieve based on ASTM standards, thereby obtaining a polymer powder having a particle size of 150 to 850 µm.

(3) Surface Crosslinking and Preparation of Final Superabsorbent Polymer 100 g of the polymer powder obtained in (2) above was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and the resulting mixture was allowed to react while drying in a hot air oven at 160° C. for 60 min. The dried powder was classified using a standard sieve based on ASTM standards, thereby obtaining a final superabsorbent polymer having a particle size of 150 to 850 µm.

TEST EXAMPLES

Evaluation of Properties

In order to evaluate the properties of the superabsorbent polymers of Reference Examples 1 to 5, Comparative Reference Example 1, Examples 1 to 12, and Comparative Examples 1 to 9, the following tests were performed.

Test Example 1

Centrifugal Retention Capacity (CRC)

The superabsorbent polymers of Reference Examples 1 to 5, Comparative Reference Example 1, Examples 1 to 12, and Comparative Examples 1 to 9 were measured for CRC before and after surface crosslinking. CRC was measured using the EDANA method WSP 241.3. Specifically, 0.2 g of a sample of the prepared superabsorbent polymer, having a particle size of 300 to 600 µm, was placed in a teabag and then immersed in a 0.9% saline solution for 30 min. Thereafter, dehydration was performed for 3 min at a centrifugal force of 250 G (gravity), and the amount of saline solution that was absorbed was measured. The results are shown in Table 1 below.

Test Example 2

Absorption Under Pressure (AUP)

The superabsorbent polymers of Reference Examples 1 to 5, Comparative Reference Example 1, Examples 1 to 12, and Comparative Examples 1 to 9 were measured for AUP. AUP was measured using the EDANA method WSP 241.3. Specifically, 0.9 g of a sample of the prepared superabsorbent polymer, having a particle size of 300 to 600 µm, was placed in a cylinder according to EDANA, and a pressure of 0.7 psi was applied using a piston and a weight. Thereafter, the amount of 0.9% saline solution that was absorbed in 60 min was measured. The results are shown in Table 1 below.

Test Example 3

Absorption Speed

The superabsorbent polymers of Reference Examples 1 to 5, Comparative Reference Example 1, Examples 1 to 12, and Comparative Examples 1 to 9 were measured for absorption speed (vortex). 50 mL of a saline was placed in a 100 mL beaker together with a magnetic bar, and stirred using a stirrer at 600 rpm. While 2.0 g of the superabsorbent polymer was added to the saline, which was stirred, the period of time required until the vortex in the beaker disappeared was measured. The results are shown in Table 1 below.

Test Example 4

Permeability

The superabsorbent polymers of Reference Examples 1 to 5, Comparative Reference Example 1, Examples 1 to 12, and Comparative Examples 1 to 9 were measured for permeability.

In order to prevent the generation of bubbles between a cock and a glass filter in the lower portion of a chromatography column, about 10 mL of water was added in the opposite direction into the column, and the column was washed two or three times with saline and then filled with at least 40 mL of 0.9% saline. A piston was placed in the chromatography column, the lower valve was opened, and the period of time (B: sec) required for the liquid surface to move from 40 mL to 20 mL was recorded, thus completing blank testing. 0.2 g of a sample of the prepared superabsorbent polymer, having a particle size ranging from 300 to 600 µm, was placed in the column, and then saline was added such that the total amount of saline that resulted was 50 mL, after which the sample was allowed to stand for 30 min so that the superabsorbent polymer was sufficiently swollen. Thereafter, a piston (0.3 psi) having a weight was placed in the chromatography column and then allowed to stand for 1 min. The cock at the bottom of the chromatography column was opened, and the period of time (T1: sec) required for the liquid surface to move from 40 mL to 20 mL was recorded. The results are shown in Table 1 below. The permeability was determined based on the following Equation 1.

Permeability=$T1-B$             [Equation 1]

Test Example 5

Particle Size of Superabsorbent Polymer

The superabsorbent polymers of Reference Examples 1 to 5, Comparative Reference Example 1, Examples 1 to 12, and Comparative Examples 1 to 9 were measured for particle size. The particle size of the superabsorbent polymer was measured using the EDANA method WSP 240.3. 100 g of the superabsorbent polymer was vibrated for 10 min under conditions of amplitude of 1.44 mm and a vibration frequency of 50 Hz using 850 µm, 600 µm, 300 µm, and 150 µm mesh sieves from Pan, after which the amount remaining on each sieve was determined.

TABLE 1

| | Use of fine additive | Kind of fine powder | Fine-powder regranulate:Hydrogel polymer | CRC before cross-linking | CRC after cross-linking | AUP | Absorption speed | permeability |
|---|---|---|---|---|---|---|---|---|
| Ref. Ex. 1 | — | — | D | 52.8 | 40.4 | 17.0 | 63 | 1200 sec or more |
| Ref. Ex. 2 | — | A | C:D = 5:95 | 52.4 | 40.1 | 16.6 | 48 | 1200 sec or more |
| Ref. Ex. 3 | — | A | C:D = 10:90 | 50.5 | 39.5 | 16.9 | 47 | 1200 sec or more |
| Ref. Ex. 4 | — | A | C:D = 25:75 | 49.7 | 38.9 | 17.6 | 46 | 1200 sec or more |
| Ref. Ex. 5 | — | A | C:D = 50:50 | 49.2 | 36.7 | 17.9 | 46 | 1200 sec or more |
| Ref. C. Ex. 1 | — | A | C | 35.6 | 29.5 | 21.1 | 43 | 110 sec |
| Ex. 1 | ○ | A:B = 8:2 | C:D = 5:95 | 51.6 | 39.7 | 16.9 | 50 | 1200 sec or more |
| Ex. 2 | ○ | A:B = 8:2 | C:D = 10:90 | 50.5 | 39.4 | 17.1 | 52 | 1200 sec or more |
| Ex. 3 | ○ | A:B = 8:2 | C:D = 25:75 | 49.6 | 38.6 | 17.9 | 51 | 1200 sec or more |
| Ex. 4 | ○ | A:B = 8:2 | C:D = 50:50 | 46.2 | 36.4 | 18.2 | 40 | 1200 sec or more |
| Ex. 5 | ○ | A:B = 7:3 | C:D = 5:95 | 51.7 | 39.3 | 17.5 | 55 | 1200 sec or more |
| Ex. 6 | ○ | A:B = 7:3 | C:D = 10:90 | 50.1 | 37.8 | 17.7 | 47 | 1200 sec or more |
| Ex. 7 | ○ | A:B = 7:3 | C:D = 25:75 | 47.2 | 36.5 | 17.8 | 45 | 1200 sec or more |
| Ex. 8 | ○ | A:B = 7:3 | C:D = 50:50 | 43.6 | 35.9 | 18.3 | 44 | 1200 sec or more |
| Ex. 9 | ○ | A:B = 6:4 | C:D = 5:95 | 52.1 | 39.0 | 16.7 | 57 | 1200 sec or more |
| Ex. 10 | ○ | A:B = 6:4 | C:D = 10:90 | 50.7 | 37.5 | 18.0 | 49 | 1200 sec or more |
| Ex. 11 | ○ | A:B = 6:4 | C:D = 25:75 | 47.5 | 34.0 | 18.3 | 45 | 1200 sec or more |
| Ex. 12 | ○ | A:B = 6:4 | C:D = 50:50 | 40.6 | 31.6 | 18.6 | 42 | 1200 sec or more |
| C. Ex. 1 | X | A:B = 8:2 | C:D = 5:95 | 50.5 | 37.6 | 12.8 | 58 | 1200 sec or more |
| C. Ex. 2 | X | A:B = 8:2 | C:D = 10:90 | 50.4 | 36.8 | 15.8 | 48 | 1200 sec or more |
| C. Ex. 3 | X | A:B = 8:2 | C:D = 25:75 | 45.5 | 33.1 | 17.2 | 47 | 1200 sec or more |
| C. Ex. 4 | X | A:B = 8:2 | C:D = 50:50 | 39.4 | 30.1 | 18.8 | 43 | 580 sec |
| C. Ex. 5 | X | A:B = 8:2 | C | 31.1 | 28.7 | 19.5 | 42 | 107 sec |
| C. Ex. 6 | X | A:B = 7:3 | C | 30.1 | 24.7 | 19.5 | 36 | 127 sec |
| C. Ex. 7 | X | A:B = 6:4 | C | 29.7 | 24.0 | 20.2 | 42 | 47 sec |
| C. Ex. 8 | X | A:B = 8:2 | C | 25.8 | 20.9 | 19.2 | 74 | 11 sec |
| C. Ex. 9 | ○ | A:B = 8:2 | C:D = 5:95 | 51.3 | 39.5 | 15.8 | 45 | 1200 sec or more |

A: first fine powder,
B: second fine powder,
C: fine-powder regranulate (Fines or R-Fines),
D: hydrogel polymer (Crumb)

As is apparent from the results of Examples 2 to 9 and Comparative Examples 1 to 4 of Table 1, when the additive was used, superior CRC and AUP, high absorption speed and high permeability were exhibited. As the ratio of the fine-powder regranulate was increased, the properties were deteriorated. When the superabsorbent polymer is prepared by recycling the fine powder, problems in which the properties may deteriorate may occur. Thus, the properties of the Reference Examples (for superabsorbent polymer without recycling of fine powder) were the most desirable. In the case where the superabsorbent polymer is prepared by recycling the fine powder, processing costs may be reduced, thus generating economic benefits. Hence, in order to minimize the deterioration of the properties while recycling the fine powder, the present inventors have used an additive.

Based on the results of Examples 1 to 4 and Comparative Examples 1 to 4 of Table 1, when the additive was used, the properties of the superabsorbent polymers (Examples 1 to 4) were superior to those of the superabsorbent polymers (Comparative Examples 1 to 4), which were prepared in the same manner with the exception that the additive was not used. Unlike Comparative Examples 1 to 4, Examples 1 to 4 manifested properties similar to those of the superabsorbent polymer of Reference Example 1. When the additive of the invention was used, the properties could be improved compared to those of conventional superabsorbent polymers using fine powder, and the amount of recycled fine powder could be increased. Furthermore, in Comparative Example 9, using only sodium hydroxide as an additive, CRC was similar to Example 1 using all additive components, but the other properties were poor compared to Example 1. Hence, the additive used in the present invention can be seen to preferably include all three components (sodium hydroxide, sodium persulfate, and particles) when possible.

The invention claimed is:

1. A method of preparing a superabsorbent polymer, comprising:
   step 1) subjecting a monomer composition, comprising a water-soluble ethylenic unsaturated monomer and a polymerization initiator, to thermal polymerization or photopolymerization, thus obtaining a hydrogel polymer;
   step 2) drying and pulverizing a portion of the hydrogel polymer of step 1), and then classifying into a base polymer having a particle size of 150 to 850 µm and a first fine powder having a particle size of less than 150 µm;
   step 3) mixing a portion of the first fine powder, a portion of the hydrogel polymer of step 1), and an additive, thus preparing a fine-powder regranulate;
   step 4) mixing the fine-powder regranulate with a portion of the hydrogel polymer of step 1) and then drying and pulverizing, followed by classifying into a superabsorbent polymer having a particle size of 150 to 850 µm and a second fine powder having a particle size of less than 150 µm, thus obtaining the superabsorbent polymer; and
   step 5) mixing the second fine powder with a portion of the first fine powder, a portion of the hydrogel polymer of step 1), and an additive, thus forming a fine-powder regranulate,
   wherein the fine-powder regranulate is recirculated back to step 4).

2. The method of claim 1, wherein the additive of step 3) comprises at least two selected from the group consisting of sodium hydroxide, sodium persulfate, and particles having i) a BET specific surface area of 300 to 1500 m²/g and ii) a porosity of 50% or more.

3. The method of claim 2, wherein the additive of step 3) is an aqueous solution comprising 1 to 5 wt % of sodium hydroxide, 0.05 to 0.5 wt % of sodium persulfate, and 0.01 to 0.4 wt % of particles, based on a total weight of the additive.

4. The method of claim 2, wherein the additive of step 3) is an aqueous solution comprising 1 to 5 wt % of sodium hydroxide and 0.05 to 0.5 wt % of sodium persulfate, based on a total weight of the additive.

5. The method of claim 2, wherein the additive of step 3) is an aqueous solution comprising 1 to 5 wt % of sodium hydroxide and 0.01 to 0.4 wt % of particles, based on a total weight of the additive.

6. The method of claim 2, wherein the additive is an aqueous solution comprising 0.05 to 0.5 wt % of sodium persulfate and 0.01 to 0.4 wt % of particles, based on a total weight of the additive.

7. The method of claim 2, wherein the particles comprise at least one selected from the group consisting of silica ($SiO_2$), alumina, carbon, and titania ($TiO_2$).

8. The method of claim 1, wherein the first fine powder is contained in an amount greater than a weight of the second fine powder.

9. The method of claim 1, wherein the hydrogel polymer is mixed in an amount of 100 to 2000 parts by weight based on 100 parts by weight of the fine-powder regranulate of step 4).

10. The method of claim 1, further comprising surface crosslinking the superabsorbent polymer obtained in step 4) using a surface crosslinking agent.

11. The method of claim 10, wherein the surface crosslinking agent comprises at least one selected from the group consisting of water; a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a multivalent metal salt; particles having i) a BET specific surface area of 300 to 1500 m²/g and ii) a porosity of 50% or more; an organic carboxylic acid compound; and an alkylene carbonate compound.

12. The method of claim 10, wherein the surface crosslinking agent comprises at least one selected from the group consisting of water, methanol, particles having i) a BET specific surface area of 300 to 1500 m²/g and ii) a porosity of 50% or more, and oxalic acid.

13. The method of claim 12, wherein the particles comprise at least one selected from the group consisting of silica, alumina, carbon, and titania.

14. The method of claim 10, wherein the surface crosslinking agent is added in an amount of 0.001 to 5 parts by weight based on 100 parts by weight of the superabsorbent polymer.

15. The method of claim 10, wherein the superabsorbent polymer has a surface temperature of 60 to 90° C. when the surface crosslinking agent is added and wherein the surface crosslinking agent has a temperature of 5 to 40° C. when the surface crosslinking agent is added.

16. The method of claim 10, wherein the surface crosslinking is performed for 10 to 20 min through a heating process using at least one selected from a heat source group consisting of steam, electricity, UV light, and IR light.

* * * * *